(12) United States Patent
Hagg et al.

(10) Patent No.: US 6,656,639 B1
(45) Date of Patent: Dec. 2, 2003

(54) BIPOLAR ELECTRODE HAVING NON-CONDUCTIVE ELECTRODE SUBSTRATE AND FIBROUS ELECTROCHEMICALLY ACTIVE MATERIAL

(75) Inventors: Christoph M. Hagg, Graz (AU); Maria Skyllas-Kazacos, New South Wales (AU)

(73) Assignee: Unisearch Limited (AU)

( * ) Notice: Subject to any disclaimer, the term of this patent is extended or adjusted under 35 U.S.C. 154(b) by 0 days.

(21) Appl. No.: 09/937,161

(22) PCT Filed: Mar. 23, 2000

(86) PCT No.: PCT/AU00/00241

§ 371 (c)(1),
(2), (4) Date: Mar. 11, 2002

(87) PCT Pub. No.: WO00/57507

PCT Pub. Date: Sep. 28, 2000

(30) Foreign Application Priority Data

Mar. 23, 1999 (AU) ................................ 99-9387

(51) Int. Cl.[7] .................... H01M 4/72; H01M 6/00
(52) U.S. Cl. ............... 429/234; 429/233; 429/210; 429/209; 29/623.3; 29/623.5; 29/623.1
(58) Field of Search ............... 429/234, 233, 429/209, 210; 29/623.3, 623.5, 623.1

(56) References Cited

FOREIGN PATENT DOCUMENTS

| JP | 63-281359 | * 11/1988 | ............ H01M/4/88 |
| JP | 63-164169 | * 7/1998 | ............ H01M/4/88 |
| WO | WO 94/06164 | * 3/1994 | ............ H01M/4/88 |

* cited by examiner

*Primary Examiner*—Patrick Ryan
*Assistant Examiner*—Angela J. Martin
(74) *Attorney, Agent, or Firm*—Townsend and Townsend and Crew

(57) ABSTRACT

Electrodes including bipolar composite electrodes and end electrodes are characterized by a layer of electrochemically active material bonded to a first surface of a non-conductive electrode substrate material. In the case of a bipolar electrode, the opposing second surface of the substrate material also carries a layer of electrically active material, the layer of electrochemically active material contacting through said substrate material to provide a current pathway. In the case of an end electrode, the opposing second surface of the substrate material carries a layer of electrically active material, the layer of electrochemically active material contacting the layer of electrically active material through the substrate material to provide a current pathway. Processes of preparing the electrodes and uses of the electrodes in batteries are also disclosed.

16 Claims, 6 Drawing Sheets

| ELECTRODE TYPE | FELT-BONDING TIME (min) | TEMPERATURE AT FELT-BONDING (°C) | AREA RESISTIVITY ($\Omega cm^2$) | EXAMPLE |
|---|---|---|---|---|
| A | 10 | 155 | 0.5-0.8 | 1 |
| C | 10 | 155 | 8-18 | 2 |
| D | 10 | 135 | 0.6 | 3 |
| E | 10 | 135 | 0.7 | 4 |
| A PLUS PLATES | 10 | 155 | 0.4 | 5 |
| C PLUS PLATES | 10 | 145 | 20-40 | 6a |
| C PLUS PLATES | 10 | 180 | 1.1-1.3 | 6b |
| C PLUS PLATES (FULL SIZE) | 15 | 180 | 0.8-1.6 | 7 |

| TYPE | $R_{START}$ ($\Omega cm^2$) | OC TIME (min) | $R_{OC}$ ($\Omega cm^2$) | $R_{rev}$ ($\Omega cm^2$) |
|---|---|---|---|---|
| 1a | 0.5 | 30 | 3.27 | 1.0 |
| 1a | 0.6 | 60 | 5.53 | 2.2 |
| SIC | 0.7 | 60 | 15.0 | 6.1 |
| STANDARD PP | 0.5 | 60 | 33.5 | 33.5 |

FIG. 9

| # | ELECTRODE TYPE | RESISTIVITY ($\Omega cm^2$) | $i$ ($mAcm^{-2}$) | COULOMBIC EFFICIENCY $\eta_C$ | ENERGY EFFICIENCY $\eta_E$ | VOLTAGE EFFICIENCY $\eta_V$ |
|---|---|---|---|---|---|---|
| 1 | 1a | 0.8 | 40 | 0.91 | 0.79 | 0.86 |
| 2 | STANDARD PP | 0.8 | 40 | 0.91 | 0.80 | 0.88 |
| 3 | 1a PLUS EXTRA FELT | 0.8 | 40 | 0.94 | 0.82 | 0.88 |

FIG. 10

BIPOLAR ELECTRODE HAVING NON-CONDUCTIVE ELECTRODE SUBSTRATE AND FIBROUS ELECTROCHEMICALLY ACTIVE MATERIAL

FIELD OF THE INVENTION

This invention relates to electrodes, particularly bipolar electrodes, particularly bipolar composite electrodes characterised by an electrochemically active layer bonded to a substrate material. The electrodes can be used in electrochemical/redox cells and other electrochemical applications.

BACKGROUND OF THE INVENTION

Electrodes are commercially applied in a wide variety of applications including being used in redox flow cells, in battery stacks and other electrochemical applications such as electrodepositing and electrowinning.

End electrodes are a type of electrode used in batteries. Typically, the end electrode in a battery stack acts as either an anode or as a cathode and has a current collector on one side. End electrodes, by their nature are connected to a power supply. One form of end electrode is conventionally characterised by an electrode substrate material, onto one side of which is bonded a thin layer of electrochemically active material such as graphite felt or carbon felt, with the other side having bonded to it a layer of electrically conductive material which acts as a current collector.

Bipolar electrodes are a form of electrode which have no direct electrical busbar connection to a power supply and act as an anode on one side and a cathode on the other side. There exist a multitude of different forms of bipolar electrodes, several of which are disclosed for example in U.S. Pat. Nos. 4,214,969, 4,339,332 and European patent application publication No. 0 268 397 A1. One particular form of bipolar electrode which is widely used in redox batteries, is conventionally characterised by an electrode substrate material, onto each side of which is bonded a thin layer of electrochemically active material such as graphite felt or carbon felt. It is an important function of the substrate material to provide a conductive pathway between the facing layers of electrochemically active material.

To date, a wide variety of materials have been used as the conducting electrode substrate material, to which the graphite or carbon felt is then bonded. Traditionally, carbon or graphite plates were used, but due to the expense of such plates coupled with their weight and their size which rendered them too bulky for large battery stack construction, these have long since been replaced. Conductive polymers or plastics have appeared in the last decade as ideal electrode materials, offering a low cost, low weight alternative to the traditional carbon or graphite. They are easy to shape, have good electrical conductivity, do not corrode, have low density and a high strength/weight ratio and are readily available. Given that most conventional polymers eg polyethylene, are not conductive (particularly when compared with the traditional metal conductors) due to the presence of saturated covalent bonds along the molecular backbone, then in order to produce conduction in polymers, it has been necessary to produce unsaturation at regular intervals along the polymer chain (such as seen in graphite). Therefore, by introducing conjugation structures (ie unsaturation) at regular intervals in conventional polymers, conducting polymers have been obtained.

However, due to the fact that conductive polymers can degrade due to thermal or electrical field environments and can be easily attacked by acidic and oxidative electrolytes, it has become apparent that in some applications, the conductive polymers are therefore unsuitable for use as bipolar or end electrodes. Accordingly, in respect of such applications, research has focussed on modified polymers in the form of polymer composites which have been successfully used as the conducting electrode substrate material in bipolar and end electrodes.

Polymer composites or conducting plastic composites (as they are also known) generally comprise polymer mixed with one or more forms of carbon and/or graphite and then pressure moulded to form the electrode. Alternatively, silver or aluminium particles can be added to ordinary polymers. Detailed research has been carried out on a variety of carbon/graphite composite plastics in order to determine the size and type of carbon particles, the form of graphite powder or fibres as well as the influence of different polymers on the conductivity behaviour of the conducting composites. Conventional bipolar electrodes which use carbon black polymer composites have relatively high (20–30%) conductive filler loadings in order to achieve acceptable conductivity through the composite material. Examples of composite plastic electrode materials which have been used as bipolar and end electrodes in fuel cell and redox battery cell applications include cross-linked polymer composite electrodes containing carbon black, a carbon fibre-carbon black thermosetting resin composite bipolar electrode; carbon-fibre-mat/resin electrode materials, carbon plastic electrodes based on polyvinylidene difluoride, Teflon® and graphite, and conducting graphite/polyethylene composite electrodes. HDPE, carbon black, graphite powder and graphite fibre can also be used to prepare a conducting plastic composite electrode.

WO 94/06164 discloses a conducting plastic composite electrode comprising a thermoplastic polymer, an elastomeric polymer and a conductive filler. In one embodiment, the electrode material comprises high density polyethylene (HDPE) cross linked with styrene-ethene-butene-styrene rubber (SEBS) block copolymer, carbon black and graphite fibre. In another embodiment, the electrode material comprises high density polyethylene (HDPE) cross linked with SEBS block copolymer, and graphite fibre.

In the manufacturing of such conducting plastic composite electrode materials, the polymer/polymer blend is mixed with the chosen form of carbon/graphite at moderately high temperature (>100° C.) and then heat and pressure moulded to form a thin, smooth conducting plastic composite sheet with good electrical conductivity and therefore low resistivity. By heat pressing a copper mesh on one side and heat-bonding a graphite felt on the other end, an end-electrode for a redox battery is made. By heat bonding a graphite/carbon felt on both sides of such a sheet, a bipolar electrode for a redox battery is completed. In the preparation of such a bipolar electrode, a window (having a border typically of about 1–8 cm around the electrode edges) is placed on either side of the conducting plastic composite sheet, and then an electrochemically active layer, typically a graphite felt layer is placed into each of the windows. This sandwich is then placed into a mould. Typically, pressure is applied to the mould for 10–15 minutes at high temperature and then cooled to obtain a conducting carbon composite plastic and graphite felt bipolar electrode.

Recently [C. M. Hagg, J. O. Besenhard and M. Skyllas-Kazacos, "Novel Carbon Polymer Electrodes for Battery Applications" in 1999 Fourteenth Annual Battery Conference on Applications and Advances (January 1998, Proceedings in press, IEEE Catalog Number: 99TH8371)], a new method for preparing low carbon black loaded polymer composite has been described as an alternative to the conventional mixing and compression moulding process described above. In the new method, fine polymer powder is first coated with a carbon black layer and subsequently heat pressed into conductive sheets. The coating of the polymer particles with the carbon black is performed using substrate induced coagulation (SIC) which results in enhanced mechanical properties and electrical conductivity of the electrodes made from such material. The composite material in the shape of flat sheets with a thickness of 1 mm was then subsequently used for the preparation of bipolar electrodes by heat bonding graphite felt to both sides of the sheets in the centre. The composite material in the shape of flat sheets with a thickness of 1 mm could also be used for the preparation of end electrodes.

It is well known that the conductivity of the composite plastics is affected by the type of polymer as well as by the type and particle size of the conducting materials used in the composite and research has focussed on obtaining composite plastics with low resistivities. It has been shown that the use of graphite powder alone gives rise to a less conductive composite, than when graphite fibre and carbon black are used in the composite. A composite containing 70% HDPE, 15% carbon black and 15% graphite fibre obtained by the conventional mixing and compression moulding process has been shown to have a resistivity of around 1 ohm/cm. Bipolar electrodes of the composites obtained from the new SIC method described above have overall area resistivities of 0.4–2.0 ohms.cm$^2$.

However, to date, such conducting plastic composite electrode materials have relatively poor electrochemical activity when compared to metals such as Cu and Fe which have resistivities of around $10^{-4}$–$10^{-6}$ $\Omega$cm. Further, because the composite plastic substrate material used in bipolar electrodes is subjected to an additional heat cycle during the felt bonding process, then such plastic composite material becomes brittle and being present in very thin sheet form as the electrode, often suffers degradation during that additional heat cycle causing voids in the composite material, with the subsequent rejection of approximately half the bipolar electrodes resulting from the felt binding process. Similar problems arise in the manufacturing of end electrodes which are also subjected to an additional heat cycle when the felt is bonded to one side of the substrate material.

Also due to the additional processing steps of adding the carbon black or other conducting material to the polymer to form the composite plastic, much time is spent on production of bipolar electrodes which increases production expense.

Further, the presence of the conducting plastic composite bipolar electrodes in a battery stack assembly also presents problems. Such stacks which comprise banks of cells (also called electrolyzers), may contain up to one hundred or more unit cells. In the design of such stacks, previously, non conducting sheets were bonded to the ends of the conducting plastic composites in order to avoid current leakage pathways through the stack. More recently, current leakage in a stack assembly has been addressed by sitting a bipolar conducting plastic composite electrode in a recess and placing an insulating frame around the edge of the conducting plastic composite sheet in order to prevent the conducting composite material contacting the channel of electrolyte. However, it has been observed that unless the electrode has been cut exactly to size, then the slightest distortion in the stack results in a cross mixing of the anolyte and catholyte solutions.

Additionally, it has been observed that some of the thin composite plastic sheets used in electrodes may have a high permeability due to pinholes and voids which, when used in redox flow cells, results in the electrolyte passing through the sheet and cross mixing and also possibly leaking out of the cell.

Finally, it has also been noted that serious problems occur during overcharging conditions using the standard plastic composite material containing carbon black or other carbonaceous forms, as electrodes. When used in systems having electrolyte solutions, side reactions of the carbon black results in degradation of the composite material which allows the electrolyte solution to penetrate into the plastic composite, with the evolution of $CO_2$ Delamination effects of the electrode result from these side reactions of the carbon black. Overcharging conditions appear to lead to oxidation of the carbonaceous materials used in the bipolar electrode.

Accordingly, there is the need for an electrode, particularly a bipolar electrode which has low resistivity and therefore high conductivity, which is strong even when used in the standard millimetre or less thicknesses and which can be used in a stack assembly without the need for insulating edging or other precautionary measures and which does not present or cause any current bypass or current leakage in such stacks. The bipolar electrode should also be cheap to manufacture, of negligible permeability; electrochemically active and stable in the electrolyte during charge-discharge cycling of a battery. It should also avoid delaminating during overcharging conditions.

There is also a need for an electrode, particularly an end electrode, which has low resistivity and therefore high conductivity, which is strong even when used in the standard millimetre or less thicknesses and which can be used in a stack assembly without the need for insulating edging or other precautionary measures and which does not present or cause current bypass or current leakage in such stacks. The end electrode should also be cheap to manufacture and of negligible permeability.

OBJECTS OF THE INVENTION

Accordingly, it is an object of the present invention to provide an electrode, particularly a bipolar electrode, which has good mechanical properties, high conductivity and high electrochemical activity and which is of low cost to produce.

It is another object of the present invention to provide a process for manufacturing such an electrode.

It is a further object of the present invention to provide a redox cell or battery stack including an electrode of the present invention.

As used herein, the term 'non conductive' is defined to mean having a resistivity higher than 1000 $\Omega$cm.

Also as used herein, the term 'electrochemically active' is defined to mean having a surface with active sites for electron transfer reactions.

Further, the term 'plastic' is defined to mean capable of being deformed, pliable, and included but is not limited to any polymeric material.

The term 'electrode' is defined to include a bipolar electrode and an end electrode.

Where the terms 'comprise', 'comprises', 'comprised' or 'comprising' are used in this specification, they are to be interpreted as specifying the presence of the stated features, integers, steps or components referred to, but not to preclude the presence or addition of one of more other features, integers, steps, components or groups thereof.

SUMMARY OF THE INVENTION

The present inventors have not discovered that it is possible to form an electrode, particularly a bipolar electrode, having a non-conductive electrode substrate material which simplifies battery stack assembly and flow-frame design. Surprisingly, the resulting bipolar electrode has good mechanical properties, high electrochemical activity and good conductivity which is as high or higher than that obtained using conventional conducting plastic composite material.

Accordingly, a first aspect of the present invention provides an electrode including a layer of non-conductive electrode substrate material having a first surface and a second surface, one of said first and second surfaces carrying a first layer of electrochemically active material, the other of said surfaces carrying a second layer of either electrochemically active material or electrically conductive material and wherein said first and second layers contact so as to provide a current transfer pathway through said substrate material.

A first embodiment of the first aspect of the present invention provides a bipolar electrode including a layer of non-conductive plastic electrode substrate material having a first surface and a second surface, each of said first and second surfaces carrying a layer of electrochemically active material wherein said layers of electrochemically active material contact so as to provide a current transfer pathway through said substrate material.

A second embodiment of the first aspect of the present invention provides a bipolar electrode including a layer of non-conductive polymeric electrode substrate material having a first surface and a second surface, each of said first and second surfaces carrying a layer of electrochemically active material wherein said layers of electrochemically active material contact so as to provide a current transfer pathway through said polymeric substrate material.

A third embodiment of the first aspect of the present invention provides a bipolar electrode including a layer of non-conductive polymeric electrode substrate material having a first surface and a second surface, each of said first and second surfaces carrying a layer of electrochemically active material and wherein said polymeric material is characterised by a melt flow index (MFI) of greater than 5 (190° C./2.16 kg) [g/10 min] such that the layers of electrochemically active material contact so as to provide a current transfer pathway through said polymeric substrate material.

A fourth embodiment of the first aspect of the present invention provides a bipolar electrode including a layer of non-conductive polymeric electrode substrate material having a first surface and an opposing second surface, each of said first and second surfaces carrying a layer of electrochemically active material and wherein said polymeric material is characterised by a melt flow index (MFI) which enables at least one of the opposing layers of electrochemically active material to penetrate through said polymeric substrate material such that said opposing layers of electrochemically active material contact to provide a current transfer pathway through said polymeric substrate material.

A fifth embodiment of the first aspect of the present invention provides a bipolar electrode including a layer of non-conductive polymeric electrode substrate material having a first surface and an opposing second surface, each of said first and second surfaces carrying a layer of electrochemically active material and wherein said polymeric material is characterised by a melt flow index (MFI) which enables the opposing layers of electrochemically active material to penetrate through said polymeric substrate material such that they contact to provide a current transfer pathway.

A sixth embodiment of the first aspect of the present invention provides a bipolar electrode including a layer of non-conductive plastic electrode substrate material having a first surface and a second surface, each of said first and second surfaces carrying a layer of electrochemically active material such that said bipolar electrode has an area resistivity of less than 2 $\Omega cm^2$ in a direction perpendicular to the first or second surface.

A seventh embodiment of the first aspect of the present invention provides an electrode including a layer of non-conductive plastic electrode substrate material having a first surface and a second surface, each of said first and second surfaces carrying a layer of electrochemically active material such that said electrode has through conductivity with an area resistivity of less than 2 $\Omega cm^2$ in a direction perpendicular to the first or second surface.

An eighth embodiment of the first aspect of the present invention provides an electrode including a layer of non-conductive plastic electrode substrate material having a first surface and a second surface, each of said first and second surfaces carrying a layer of electrochemically active material and wherein said layers of electrochemically active material contact so as to provide a current transfer pathway through said polymeric material such that said electrode has an area resistivity of less than 2 $\Omega cm^2$ in a direction perpendicular to the first or second surface.

A ninth embodiment of the first aspect of the present invention provides an end electrode including a layer of non-conductive plastic electrode substrate material having a first surface and a second surface, one of said first and second surfaces carrying a first layer of electrochemically active material, the other of said surfaces carrying a second layer of electrically conductive material and wherein said first and second layers contact so as to provide a current transfer pathway through said plastic substrate material.

A tenth embodiment of the first aspect of the present invention provides an end electrode of the ninth embodiment wherein the non-conductive plastic electrode substrate material is a non-conductive polymeric material characterised by a melt flow index (MFI) of greater than 5 (190° C./2.16 kg) [g/10 min] such that the first and second layers contact so as to provide a current transfer pathway through said polymeric substrate material.

An eleventh embodiment of the first aspect of the present invention provides an end electrode of the ninth embodiment of the present invention wherein the non-conductive plastic electrode substrate material is a non-conductive polymeric material characterised by a melt flow index (MFI) which enables the layer of electrochemically active material to penetrate through said polymeric substrate material and contact the electrically conductive material so as to provide a current transfer pathway through said polymeric substrate material.

A twelfth embodiment of the first aspect of the present invention provides an end electrode including a layer of non-conductive plastic electrode substrate material having a first surface and a second surface, one of said first and second surfaces carrying a layer of electrochemically active material, the other of said surfaces carrying a second layer of electrically conductive material such that said electrode has an area resistivity of less than b 2$\Omega cm^2$ in a direction perpendicular to the first or second surface.

A thirteenth embodiment of the first aspect of the present invention provides an end electrode including a layer of non-conductive plastic electrode substrate material having a first surface and a second surface, one of said first and second surfaces carrying a first layer of electrochemically active material, the other of said surfaces carrying a second layer of electrically conductive material such that said electrode has through conductivity with an area resistivity of less than 2 $\Omega cm^2$ in a direction perpendicular to the first or second surface.

A fourteenth embodiment of the first aspect of the present invention provides an electrode including a layer of non-conductive plastic electrode substrate material having a first surface and a second surface, one of said first and second surface carrying a first layer of electrochemically active material, the other of said surfaces carrying a second layer of electrically conductive material wherein said first and second layers contact such that said electrode has through conductivity with an area resistivity of less than 2 $\Omega cm^2$ in a direction perpendicular to the first or second surface.

A second aspect of the present invention provides a process for manufacturing an electrode, said process including forming an assembly comprising a layer of non-conductive plastic electrode substrate material between either a first and second layer of electrochemically active material, or a first layer of electrochemically active material and a second layer of electrically conductive material and applying heat and pressure to said assembly such that the first and second layers are caused to contact so as to provide a current transfer pathway through said polymeric substrate material.

A first embodiment of the second aspect of the present invention provides a process for manufacturing a bipolar electrode, said process including forming an assembly comprising a layer of non-conductive plastic electrode substrate material between two opposing layers of electrochemically active material, and applying heat and pressure to said assembly such that the opposing layers of electrochemically active material are caused to penetrate through said polymeric substrate material such that they contact to provide a current transfer pathway.

A second embodiment of the second aspect of the present invention provides a process for manufacturing a bipolar electrode, said process including forming an assembly comprising a layer of non-conductive polymeric electrode substrate material between two layers of electrochemically active material, and applying heat and pressure to said assembly, said polymeric material being characterised by a melt flow index (MFI) such that said application of pressure causes the opposing layers of electrochemically active material to penetrate through said polymeric substrate material and contact to provide a current transfer pathway.

A third embodiment of the second aspect of the present invention provides a process for manufacturing an electrode, said process including forming an assembly comprising a layer of non-conductive polymeric electrode substrate material between two layers of electrochemically active material, and applying heat and pressure to said assembly, said polymeric material being characterised by a melt flow index (MFI) such that said application of pressure causes at least one of the opposing layers of electrochemically active material to penetrate through said polymeric substrate material such that said opposing layers of electrochemically active material contact to provide a current transfer pathway.

A fourth embodiment of the second aspect of the present invention provides a process for manufacturing an end electrode, said process including forming an assembly comprising a layer of non-conductive plastic electrode substrate material between a first layer of electrochemically active material and an opposing second layer of electrically conductive material, and applying heat and pressure to said assembly, such that the layer of electrochemically active material is caused to penetrate through said polymeric substrate material and contact said layer of electrically conductive material to provide a current transfer pathway through said plastic substrate material.

A fifth embodiment of the second aspect of the present invention provides a process for manufacturing an end electrode, said process including forming an assembly comprising a layer of non-conductive polymeric electrode substrate material between a first layer of electrochemically active material and an opposing second layer of electrically conductive material, and applying heat and pressure to said assembly, said polymeric material being characterised by a melt flow index (MFI) such that said application of pressure causes the opposing layer of electrochemically active material to penetrate through said polymeric substrate material and contact said layer of electrically conductive material to provide a current transfer pathway.

A third aspect of the present invention provides a battery including a catholyte in electrical contact with a positive electrode and an anolyte in electrical contact with a negative electrode, wherein at least one of the positive and negative electrodes is an electrode of any embodiment of the first aspect of the present invention, or an electrode when prepared according to the process of any embodiment of the second aspect of the present invention.

In one embodiment of the third aspect of the present invention, the battery is a redox battery.

A fourth aspect of the present invention provides an all-vanadium redox battery having a positive compartment containing a catholyte in electrical contact with a positive electrode, the catholyte comprising an electrolyte containing tetravalent or pentavalent vanadium ions, a negative compartment containing an anolyte in electrical contact with a negative electrode, the anolyte comprising an electrolyte containing tetravalent, trivalent or divalent vanadium ions, and an ionic conducting separator disposed between the positive and negative compartments and in contact with the catholyte and anolyte to provide ionic communication there between and wherein the catholyte includes a salt selected from $V_2O_5$, $V_2O_3$, $V_2O_4$, VO, $VSO_4$, $VOSO_4$, $V_2(SO_4)_3$, $(VO_2)SO_4$ and $NH_4VO_3$, and the concentration of the salt is 0.1M to 8.0M, more particularly 0.1M to 5.0M and wherein at least one of the positive and negative electrodes is an electrode of any embodiment of the first aspect, or an electrode when prepared according to the process of any embodiment of the second aspect of the present invention.

Typically, the electrodes of the present invention are bipolar electrodes.

Typically, the electrodes, particularly the bipolar electrodes of the present invention can also be used in other redox cell batteries such as the iron-chromium system and in any type of industrial electrolysis of the bipolar cell configuration using porous, flow-through electrodes.

Typically, the electrochemically active material is a fibrous material for example carbon felt or graphite felt.

Typically, a bipolar electrode of the present invention includes a layer of non-conductive electrode substrate material having a first and second surface, each of said surfaces carrying a layer of electrochemically active fibrous material wherein at least some fibres of at least one of said layers of electrochemically active material penetrate said electrode substrate material and contact to provide a current transfer pathway between said layers through the substrate material.

More typically, in a bipolar electrode of the present invention including a layer of non-conductive electrode substrate material having a first and second surface, each of said surfaces carrying a layer of fibrous electrochemically active material, it is typical that fibres of both of the opposing layers of electrochemically active material penetrate the electrode substrate material and contact to provide a current transfer pathway between said layers through the substrate material.

In an end electrode of the present invention having a first layer of fibrous electrochemically active material and an opposing second layer of electrically conductive material, it is typical that fibres of the first layer of electrochemically active material penetrate the electrode substrate material and contact the layer of electrically conductive material to provide a current transfer pathway through the substrate material.

In one embodiment there is provided an end electrode for use in a bipolar stack including a layer of non-conductive polymeric electrode substrate material having a first surface and an opposing second surface, one of said first and second surfaces having bonded to it a layer of fibrous electrochemically active material, typically graphite or carbon felt, and the other of said first and second surfaces having bonded to it a layer of electrically conductive material, typically metal mesh or expanded metal, and wherein fibres of said electrochemically active material penetrate through said substrate material and contact with said electrically conductive material so to provide a current transfer pathway through said substrate material.

Typically, in the directly preceding embodiment of an end electrode, said layer of electrically conductive material acts as a current collector.

In another embodiment there is provided an end electrode for use in a bipolar stack including a layer of non-conductive polymeric electrode substrate material having a first surface and an opposing second surface, one of said first and second surfaces having bonded to it a layer of graphite or carbon felt, and the other of said first and second surfaces having bonded to it a layer of metal mesh or expanded metal, and wherein fibres of said graphite or felt penetrate through said substrate material and contact with said metal layer so as to provide a current transfer pathway through said substrate material.

In a preferred embodiment of the present invention there is provided a bipolar electrode including a layer of non-conductive polymeric electrode substrate material having a first surface and an opposing second surface, each of said first and second surfaces having bonded to them, a layer of graphite or carbon felt and wherein said polymeric material is characterised by a MFI such that graphite or carbon fibres of said opposing graphite or carbon felt layers penetrate through said substrate material and contact to provide a current transfer pathway.

In a further embodiment of an end electrode of the present invention, a bipolar electrode of the present invention further includes a layer of electrically conductive material contacting one of the first or second layers of electrochemically active material such that the layer of electrically conductive material acts as a current collector.

Typically, in the embodiments of the invention, the first and second surfaces of the sheet of substrate material are opposing as in opposing facing.

It is also typical that the layer of substrate material is in the form of a thin sheet or strip.

It is typical that the non-conductive electrode substrate material is plastic, as fibrous electrochemically active material is more easily able to penetrate through such a material.

It is therefore typical in the bipolar electrodes of the present invention that the electrode substrate material is plastic as the fibres from each of the opposing layers of fibrous electrochemically active material can penetrate and contact through such a material. More typically, the electrode substrate material is a polymeric material. Typically, any insulating polymeric material can be used.

Examples of such polymers include, by way of illustration only, endcapped polyacetals such as poly(oxymethylene), polyformaldehyde, poly(trichloroacetaldehyde, poly(n-valeraldehyde), poly(acetaldehyde), poly(propionaldehyde) and the like; acrylic polymers such as polyacrylamide, poly(acrylicacid), poly(methacrylic acid), poly(ethyl acrylate), poly(methyl methacrylate) and the like; fluorocarbon polymers such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride, poly(vinylfluoride) and the like; polyamides such as poly(6-aminocaproic acid) or poly(e-capro-lactam) and the like; polyaramides such as poly(imino-1,3-phenyleneiminoisophthaloyl) and the like; parylenes such as poly-p-xylylene and the like; polyaryl ethers such as poly(p-phenylene oxide) and the like; polyaryl sulfones; polycarbonates; polyesters such as poly(ethyleneterephthalate), poly(tetraethylene terephthalate), poly(cyclohexylene-1,4-dimethylene terephthalate) and the like; polyaryl sulfides such as poly(thio-1,4-phenylene) and the likeC2–C12 polyolefins such as polyethylene, polypropylene, polybutylene, poly(1-butene), poly(2-butene), poly(1-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, low density polyethylene, high density polyethylene, and the like, copolymers of the foregoing and other insulating and oxidation resistant polymeric materials. Further examples of polymers which may be used as the electrode substrate material may be found in "Polymer Handbook" editors J. Bandrup and E. H. Immergut, 3rd Edn, John Wiley & Sons, New York, 1989; "Compounding Materials for the Polymer Industries, J. S. Dick, Noyes Publications, Park Ridge, N.J. 1987; "Handbook of Thermoset Plastics", S. H. Goodman, Noyes Publications, Park Ridge, N.J. 1986; and "Handbook of Plastics Materials and Technology" Irvin I. Rubin (Ed) John Wiley & Sons, New York, 1990; the contents of all of which are incorporated herein by cross reference.

Typically the polymer is characterised by a melt flow index (MFI) which allows the penetration of the opposing layers of electrochemically active material into the polymer material during formation of the bipolar electrode such that the opposing layers of material contact or interconnect and thereby result in a through conductivity of the bipolar electrode.

The MFI of the polymer used in the formation of the electrodes of the present invention measured at 190° C. under a 2.16 kg load according to ASTM D1238, is typically in the range of from 5–70 (190° C./2.16 kg([g/10 min], also typically in the range of from 5–50 (190° C./2.16 kg([g/10 min], more typically in the range of from 10–40 (190° C./2.16 kg([g/10 min], even more typically in the range of from 10–20 (190° C./2.16 kg([g/10 min] still more typically in the range of from 10–15 (190° C./2.16 kg([g/10 min].

Typically, in the formation of a bipolar electrode when bonding the layers of electrochemically active material to each side of a polymer, the temperature and pressure required for the bonding process depends on the melting point and melt flow index of the polymeric material used. Typically, the higher the melt flow index, the lower the pressure needed to achieve good penetration of the fibres of the layers of electrochemically active material. Typically, the temperature ranges from just above the softening point of the plastic to just below the decomposition temperature.

In a typical case, a polymeric material having an MFI of about 5 (190° C./2.16 kg([g/10 min], requires pressure in the range of from 0.1–50 kg cm$^{-2}$ in the felt bonding process.

Preferably the polymeric substrate material is high density polyethylene with an MFI (190/2.16)[g/10 min] of about 10–17.5. Melt flow indices (MFI) are determined using a melt flow indexer, and in the present case (as stated above) were measured at 190° C. under a 2.16 kg load.

In the preparation of an electrode of the present invention it is usual that the sheet of electrode substrate material is about 0.02–3.0 cm, more usually 0.02–1.0 cm, more usually 0.5–3.0 mm in thickness, most usually the sheet is about 0.5–2.0 mm in thickness.

Typically, the electrochemically active material which is carried on at least one of the opposing surfaces or faces of the electrode substrate material in electrodes of the present invention is carbon, graphite, metallized fibres, pitch derived carbon fibres, graphite fibres, polyacrylonitrile carbon fibres and polyacrylocitrile-derived graphite fibres.

Typically in the end electrodes of the present invention where one of the opposing surfaces or faces of the electrode substrate material is carrying a layer of electrically conductive material, the electrically conductive material is typically any conductive metal including metal mesh, expanded metal and metal foil. Examples of typical conductive metals include zinc, copper and titanium; copper or brass mesh are also typically used, as are carbon and graphite.

Typically said metal mesh is at least about 0.5 mm thick.

More typically the electrochemically active material which is carried on at least one of the opposing surfaces or faces of the electrode substrate material is carbon felt or graphite felt which are made up respectively of carbon fibres and graphite fibres. Carbon and graphite felts are generally woven from yarns which are bundles of individual carbon monofilaments generally having a diameter in the range of from about 1 to 50 $\mu$m, usually in the range from about 5 to 10 $\mu$m. The yarns will typically include from about 100 to 20,000 monofilaments, usually having from about 3,000 to 6,000 filaments. The denier of the yarns used as in fabricating the carbon felts will typically be in the range from about 500 to 5,000 mg/m, usually being in the range from about 1,000 to 2,000 mg/m. Denier is equal to the number of grams which yield 9,000 metres of the yarn or filament. The yarns are woven by conventional weaving machines yielding large fabrics which may be cut into the desired dimensions for the electrode. Each electrode may employ a plurality of layers of the material, so that the final dimensions of the electrode may vary widely.

It is also desirable for the fibres to have a three dimensional structure with at least 10% of the fibres oriented in a direction perpendicular to the plane of the felt. This permits easier penetration of the fibres through the plastic substrate so that in the case of a bipolar electrode of the present invention, contact can be made with the electrochemically active material on the opposite side. Typically, the graphite felt is Toyoba, Sigri or FMI carbon or graphite felt types.

Generally however, the electrochemically active material which is bonded to each surface of the electrode substrate material in bipolar electrodes of the present invention is about 6 mm thick or less. Graphite felt which is most commonly used in the preparation of electrodes of the present invention is typically used at a thickness of about 1.0–5.0 mm, more typically about 2.0–5.0 mm.

Typically, in the fabrication of a bipolar electrode, the electrochemically active material is bonded such as by heat and/or compression bonding, onto the opposing surfaces or faces of the electrode substrate material. During the bonding process, the fibres of the opposing layers of graphite felt or other electrochemically active material penetrate the polymer electrode substitute material and contact, thus allowing for conductivity through the bipolar electrode.

Typically bipolar electrodes of the present invention have area resistivities of less than 2 $\Omega$cm$^2$, more typically less than 1 $\Omega$cm$^2$. Still more typically, the area resistivity of a bipolar electrode of the first aspect of the invention or a bipolar electrode made according to the second aspect of the present invention is in the range of 0.01 to 0.9 $\Omega$cm$^2$, even more typically it is in the range of 0.1 to 0.9 $\Omega$cm$^2$ or approximately two (2) times the area resistivity of the graphite or carbon felt itself (since two sheets are used in the fabrication of the bipolar electrode).

Typically, in the process of manufacturing a bipolar electrode, the pressure is applied at a temperature of between about 70–200° C. depending on the plastic material used. The temperature used should be just above the softening point of the plastic to just below the decomposition temperature. It is also typically that once pressure has been applied and the bipolar electrode is formed, the electrode is then cooled to room temperature.

Typically to prepare a bipolar electrode, a sheet of electrochemically active material such as graphite felt is placed in the bottom of a mould. The sheet of polymeric substrate material according to the present invention is placed on top and then a second sheet of electrochemically active material is placed on top of the substrate sheet. The mould can be preheated up to 100–750° C., more typically 120–400° C., still more typically 120–220° C. (such as for polyethylene or polypropylene).

Pressure of from about 0.1 kg cm$^{-2}$ up to 5 kg cm$^{-2}$, typically up to 2–5 kg cm$^{-2}$, more typically 2 kg cm$^{-2}$ is applied to the mould at preferably about 120–220° C. which is maintained for 5–90 minutes, typically 5–40 minutes, more typically 5–15 minutes. The mould is then cooled to room temperature to obtain the bipolar electrode.

Typically, the electrochemically active material such as graphite felt is bonded to the sheet of substrate material at about 110–180° C. for LDPE of 130–200° C. for HDPE and a pressure in the range of 1–20 kg cm$^{-2}$. The bonding typically takes about 5–10 minutes. More typically, the pressure applied is in the range of about 1–15 kg cm$^{-2}$, still more typically the pressure applied is about 1–10 kg cm$^{-2}$.

The extent of contact of the opposing layers of electrochemically active material in a bipolar electrode typically depends on the conditions in the felt bonding process as well as the fluidity of the substrate material. These can both assist the penetration of the fibres of the opposing layers into the substrate material. A plastic substrate material having a moderate-high MFI value, allows for good penetration and contact of the fibres of the opposing layers of graphite felt or other electrochemically active material. A polymer with a very high MFI therefore generally provides an optimum substrate material for producing bipolar graphite felt electrodes.

It is typical in bipolar electrodes of the present invention that the fibres of the opposing layers of the electrochemically active material penetrate into the substrate material from each side, contact, overlap and/or interfere with each other to provide a bridge for the electrical current up to a depth of at least half the thickness of the substrate sheet from each side. Typically at least 50%, more usually 60–100% of the fibres of the opposing layers of electrochemically active material penetrate into the substrate material from each side, contact, overlap and/or interfere with each other to provide a bridge for the electrical current. Typically, the fibres penetrate up to 50–100% of the thickness of the sheet material, more typically they penetrate up to 50 to 60% of the sheet material from each side. The degree of contacting/interconnection of the fibres of the electrochemically active material is responsible for the achieved low area resistance through the electrochemically active material areas of the bipolar electrode. However, a sufficient thickness of the graphite felt must remain exposed on either side to provide adequate surface area for the flow-through electrode.

The present invention is predicated on the surprising discovery that it is not necessary in an electrode, for example a bipolar electrode to have an electrode substrate material which is conductive, provided that through conductivity can instead be achieved during the felt bonding stage by an alternate current transfer pathway. As a consequence of this discovery, bipolar electrodes of the present invention provide the alternate current transfer pathway by means of interconnecting of the fibres of the opposing layers of graphite felt or other electrochemically active material which are present on the opposing surfaces of the electrode substrate. The invention is particularly surprising given that previously, deep or through penetration of the electrochemically active material into an electrode substrate made of plastic composite material (for example) was sought to be avoided as such penetration was considered to be detrimental to the performance of the bipolar electrode, and was thought to provide channels through which electrolyte solution could pass. Such a problem which presents in conventional high carbon loading composite substrates, does not occur with the present zero carbon plastic substrates since the material has better flow properties and intimately contacts the fibres so that no voids are created to produce undesirable channels through the electrode.

The electrodes, particularly the bipolar electrodes of the present invention therefore display good conductivity, excellent mechanical properties and low permeability. Advantageously, the properties of the electrodes of the present invention are mainly characterised by the mechanical properties of the polymer which is used as the substrate material. The simplicity of the production process offers a drastic reduction of electrode production costs as standard polymer products are used and production time is minimised by avoiding mixing of components or coating procedures, as well as allowing for carbon black dust free cutting of the final design of the electrode. The electrodes are extremely cost effective to manufacture and the fact that the electrode substrate is non-conductive means that battery stack assembly is now simplified as the application of non-conductive edging to the electrode, or its careful shaping and then alignment in the stack is no longer required. Further, monitoring of individual bipolar cells in a stack (bipolar electrolyser) is also no longer required. Most importantly, now that no carbonaceous forms are required in the substrate material, the electrode does not degrade and no delamination effect is observed during accidental overcharge of the stacks.

BRIEF DESCRIPTION OF THE DRAWINGS

FIG. 6 is a graph illustrating the effect of bonding time on conductivity of bipolar electrodes of the present invention;

FIGS. 8–10 are tables that show test results of various materials treated in accordance with the invention.

BEST MODE AND OTHER MODES OF PERFORMING THE INVENTION

An HDPE polymer sheet of dimensions 100×110×1 mm is produced by means of compression moulding of HDPE powder. The sheet is pressed for about 10 minutes in a preheated mould at 43 kg/cm$^2$ and about 140–160° C. After pressing, the mould is quenched in a cold water tank and polymer sheets obtained. Alternatively, an extruded HDPE sheet can be obtained commercially.

Figure 2A:
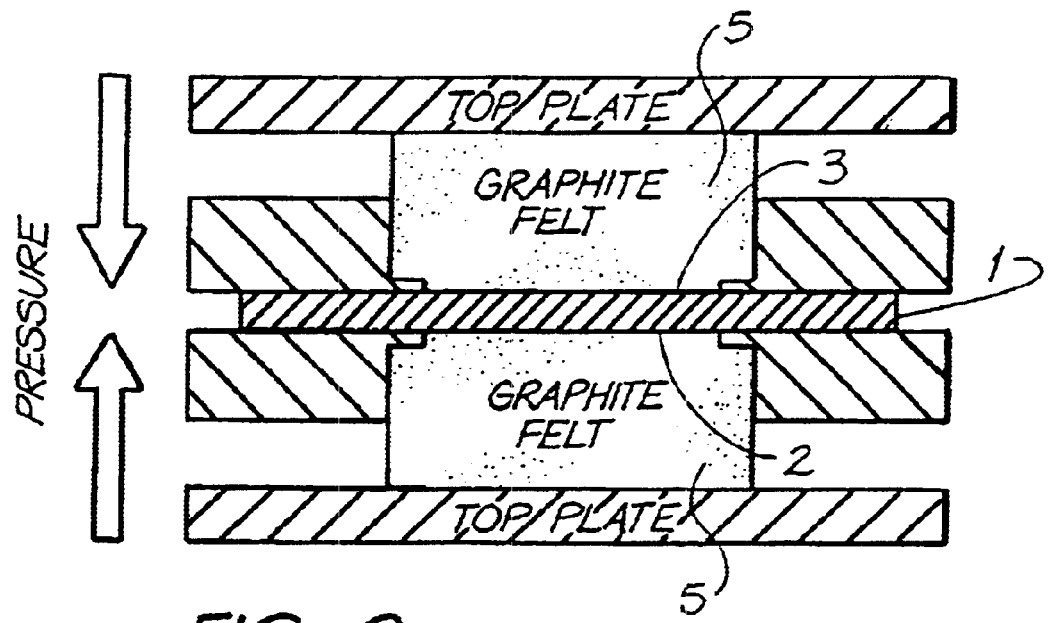
FIG. 2a) illustrates in cross section the setup for the process of bonding the electrochemically active layer to the substrate.
Figure 5:
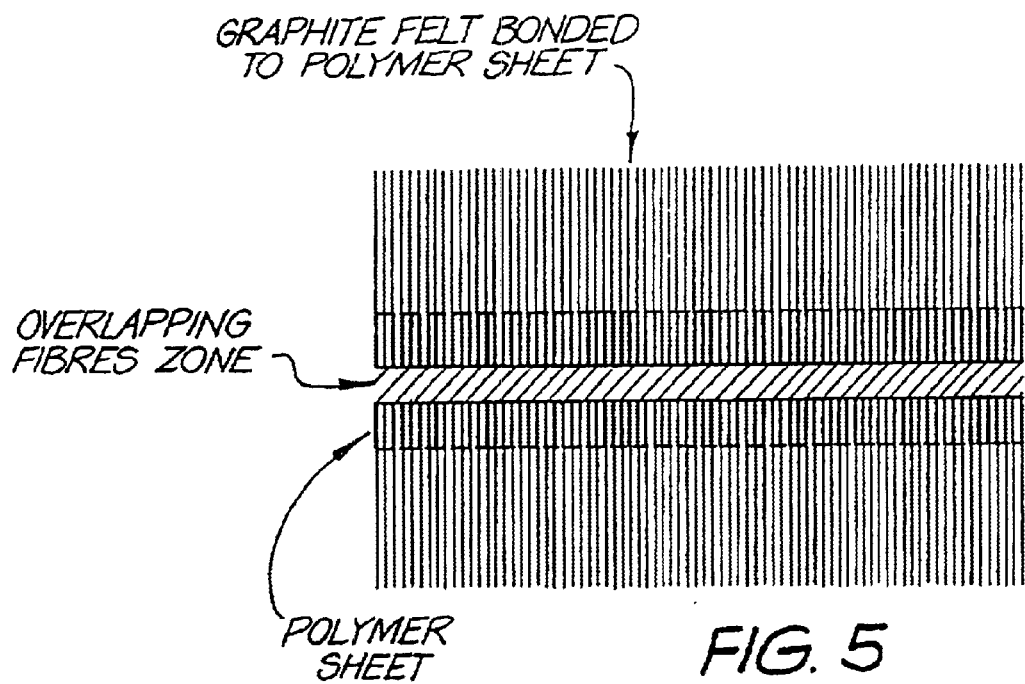
FIG. 5 illustrates the cross section of a bipolar electrode of the present invention with contacting opposing fibres of electrochemically active material.
Figures 6, 8:
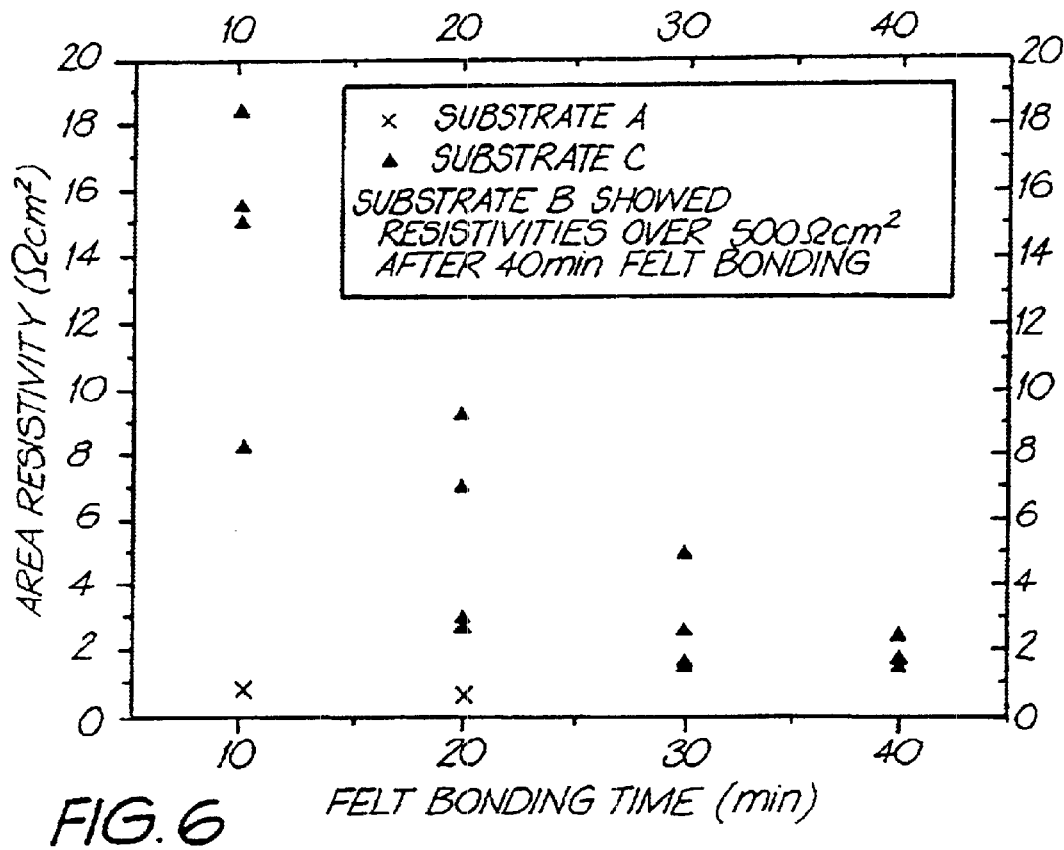

To prepare a bipolar electrode, a window is placed on either side of the polymer sheet and then an electrochemically active layer, typically a graphite felt layer of dimensions 50×50×2 mm, is placed into each of the two windows, and this assembly is then placed in a mould. The graphite felt is then heat bonded to both sides in the centre of the polymer sheet in the mould, with the bonding occurring at about 145–160° C. and a pressure of about 2.2 kg cm$^{-2}$ being applied to the mould for about 5–35 minutes. The mould is then cooled to obtain a polymer/graphite felt bipolar electrode of high conductivity as illustrated in FIG. 5. FIG. 2a) illustrates the assembly with the polymer sheet (1) having a first surface (2) and an opposing second surface (3) which is substantially opposite facing to the first surface, each of the first and second opposing surfaces being bonded to a layer of graphite felt (5). FIG. 6 illustrates the effect of the bonding time on the conductivity of the bipolar electrodes produced.

The area resistivity was measured by a method characterised by setting the bipolar electrodes between two copper plates, applying a pressure of 0.2 kg cm$^{-2}$. The potential drop at various currents applied to copper plates was measured and the resistance calculated. Differing area resistivities of electrodes of the present invention are shown in Table II.

Figure 2B:
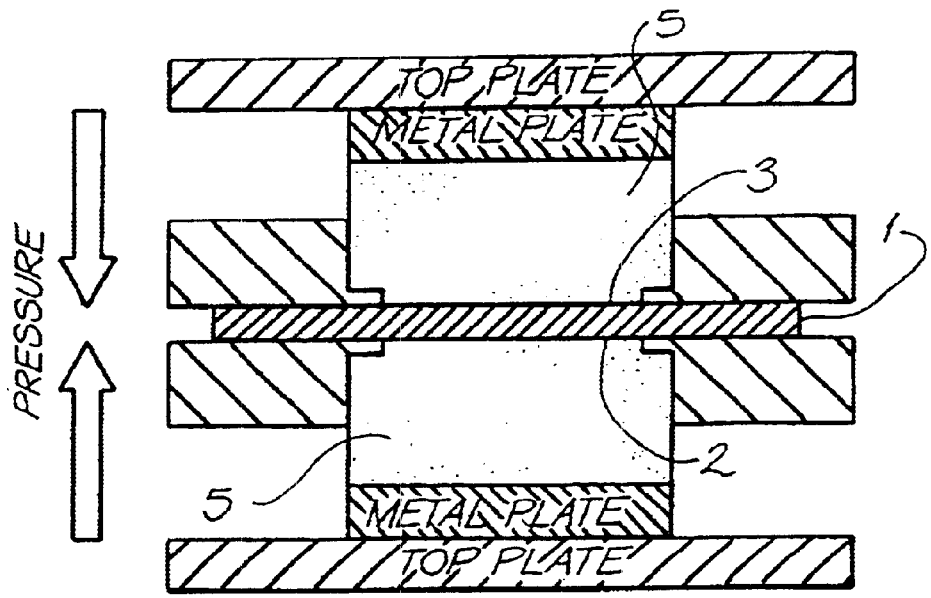
FIG. 2b) illustrates in cross section the setup for the process of bonding the electrochemically active layer to the substrate, with additional metal plates to effect increased pressure.

To obtain a full scale bipolar electrode of the present invention for use in a 1–5 kW stack. LDPE sheet of about 1 mm thickness is used having the dimension of a full size electrode (700×450×1 mm). The LDPE sheet is used as a substrate in the above described felt bonding process occurring at about 180° C., with a pressure of about 2.2 kg cm$^{-2}$ being applied to the mould for about 15–30 minutes. Felt size was 500×320×5 mm of Sigri Graphite felt. Additionally, two copper plates [Length×Width×Height (L×W×H): 500× 300×1 mm] were inserted on each side of the graphite felt/substrate assembly during the felt bonding process to increase the pressure on the felt for enhanced penetration of the graphite fibres into the polymer sheet substrate (see FIG. 2b where 'metal plates' are inserted on either side of the graphite felt/substrate assembly and just beneath each of the 'top plates'). The results of the area resistivity measurements are shown in Table II.

EXAMPLES

Basic Electrode Substrate Material

Material A)

HDPE sheets produced by means of compression moulding of HDPE-powder was used for the preparation of carbon black free bipolar graphite felt electrodes. As HDPE-powder, GA 7260H powder, Kemcor Australia was used. The sheets were pressed for 10 minutes in an aluminium mould with the inner mould dimensions of 110×100×1 mm (l×w×h) under a pressure of 43 kg/cm$^2$ and a temperature of 155° C. The mould was preheated for 10 minutes before applying the pressure. After pressing, the mould was quenched in a cold water tank. The physical properties of the obtained polymer sheets are given in Table I.

Material C)

Extruded LDPE-material provided by E-PLAS PTY. LTD., AUSTRALIA with a thickness of 1 mm was used as sheet material for electrode preparation. Physical properties are given in Table I.

Material D)

LDPE sheets produced by means of compression moulding of LDPE-granule was used for the preparation of carbon black free bipolar graphite felt electrodes. Alkathene LDPE granule, grade WSM 168, Orica Polythene, Australia was used as granule material. The sheets were pressed for 10 minutes in an aluminium mould with the inner mould dimensions of 110×100×1 mm (l×w×h) under a pressure of 43 kg/cm$^2$ and a temperature of 135° C. The mould was preheated for 10 minutes before applying the pressure. After pressing, the mould was quenched in a cold water tank. The physical properties of the obtained polymer sheets are given in Table I.

Material E)

LDPE sheets produced by means of compression moulding of LDPE-granule was used for the preparation of carbon black free bipolar graphite felt electrodes. ALkathene LDPE granule, grade WRM 124, Orica Polythene, Australia was used as granule material. The sheets were pressed for 10 minutes in an aluminium mould with the inner mould dimensions of 110×100×1 mm (l×w×h) under a pressure of 43 kg/cm$^2$ and a temperature of 135° C. The mould was preheated for 10 minutes before applying the pressure. After pressing, the mould was quenched in a cold water tank. The physical properties of the obtained polymer sheets are given in Table I.

The properties of composite sheets and bipolar electrodes fabricated using standard high carbon black (20–30%, carbon black filled PE and PP) and low carbon black (1–3%, SIC electrode) substrates were also evaluated for comparison.

TABLE I

Mechanical Properties (ASTM D-638) of composite sheets and melt flow index of substrate material (ASTM 1238)

| Material | MFI 190/2.16 [g/10 min] | Tensile strength [MPa] | $\Delta$ L [mm] | % El. | Elast. Mod. [GPa] |
|---|---|---|---|---|---|
| A (powder) | 17.5 | 26.0 | No break | — | — |
| C | N/A | 23.7 | No break | — | — |
| D* | 63 | 8.2 | | 315 | 0.168 |
| E* | 22 | 8.9 | | 290 | 0.158 |
| SIC | 18.5 | 26.2 | 1.65 | 4.1 | 0.82 |
| Standard PE composite | N/A | 23.1 | 2.3 | 4.7 | 0.49 |
| Standard PP + rubber Composite | 5 (195/5) | 22.1 | 0.66 | 1.7 | 1.30 |

*) Data provided by Orica Polythene, Australia

Characterisation of the Mechanical Properties of the Substrate Materials

Tensile strength: ASTM D638
Melt Flow Index: ASTM 1238

The mechanical properties according to ASTM D-638, characterised by the values of percentage elongation and tensile strength at break of the substrate material, were measured on an Instron M 1185 Universal Testing Machine. Melt flow indices (MFI) of the substrate materials were determined with a Davenport (Daventest Ltd., UK) melt flow indexer. MFI was measured at 190° C. under a 2.16 kg load according to ASTM D1238.

Felt Bonding Process I

Figure 1:
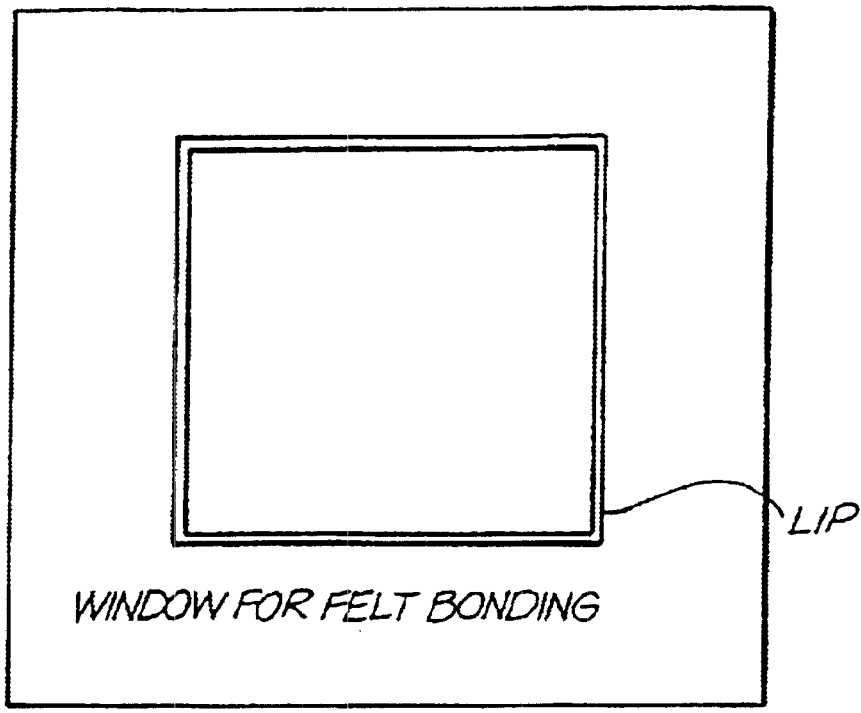
FIG. 1 illustrates a "window" or frame having a special lip and used in the felt bonding process.

To prepare a bipolar electrode, two aluminium frames (windows, see also FIG. 1) for adjustment of the electrochemical active graphite felt during the felt bonding process are required. A preferable design of such a window is a frame which has a special metal lip as it is illustrated in FIGS. 1 and 2. This lip hinders melted polymer material from creeping up the sidewalls of the graphite felt which can result in an undesirable ridge around the graphite felt making it difficult to seal the electrodes against the electrolyte flow-frames during stack construction. The graphite felt sheets (FMI Graphite, USA, 50×50×2 mm) are placed into such windows on both sides of the polymer sheet (see also FIG. 2) and are heat bonded to the centre of substrate materials A–C (100×110×1 mm).

The felt bonding was conducted for various times at 155° C., if not stated otherwise, and an applied pressure of 2.2 kg/cm$^2$. The effect of felt bonding time on conductivity of the bipolar electrodes with different substrate materials are shown in FIG. 6.

Characterisation of the Bipolar Electrodes

Test I)

Area resistivity characterisation of the produced electrodes was done by means of setting the bipolar electrodes between two copper plates and applying a pressure of 0.2 kg cm$^{-2}$. The potential drop was measured at various currents applied to the copper plates and the resistance calculated.

Test II)

Permeability, static:

The bipolar electrode was assembled within two electrolyte compartments containing on the one side a 2 molar Vanadium solution comprising 1M V(III)+1M V(IV)+2.5M $H_2SO_4$ (SOC 3.5) and on the other side of the graphite felt area a 2 molar $H_2SO_4$ solution. Permeation of the Vanadium solution through the electrode at the graphite felt area was tested by means of UV-Vis analysis of the $H_2SO_4$ solution.
Test III)
Permeability, dynamic:
The bipolar electrode was assembled in a flow cell, whereon the one side a 2 molar Vanadium solution (SOC 3.5) and on the other side of the graphite felt area a 2 molar $H_2SO_4$ solution were pumped through (see also FIG. 3). Permeation of the Vanadium solution through the electrode at the graphite felt area was tested by means of UV-Vis analysis of the $H_2SO_4$ solution.
Test IV)
Overcharging behaviour:
The bipolar electrode was overcharged for various periods at 40 mAcm$^{-2}$. Area resistivity before ($R_{start}$) and after overcharging ($R_{oc}$) was measured according to Test I. Furthermore, the resistivity of the electrodes was measured after setting up the cell in a reverse mode ($R_{rev}$). This test is made to show if the oxidation products formed on the graphite felt during overcharging can be reduced and a recovering of the electrode performance is possible. Results are shown in FIG. 9 (Table III).
Test V)
Cell performance:
The bipolar electrode was cycled between 800 and 1800 mV Cell Voltage at 40 mAcm$^{-2}$. Cell Voltage was recorded with a xt-chart-recorder. Results are shown in FIG. 10 (Table IV).

Figure 4:
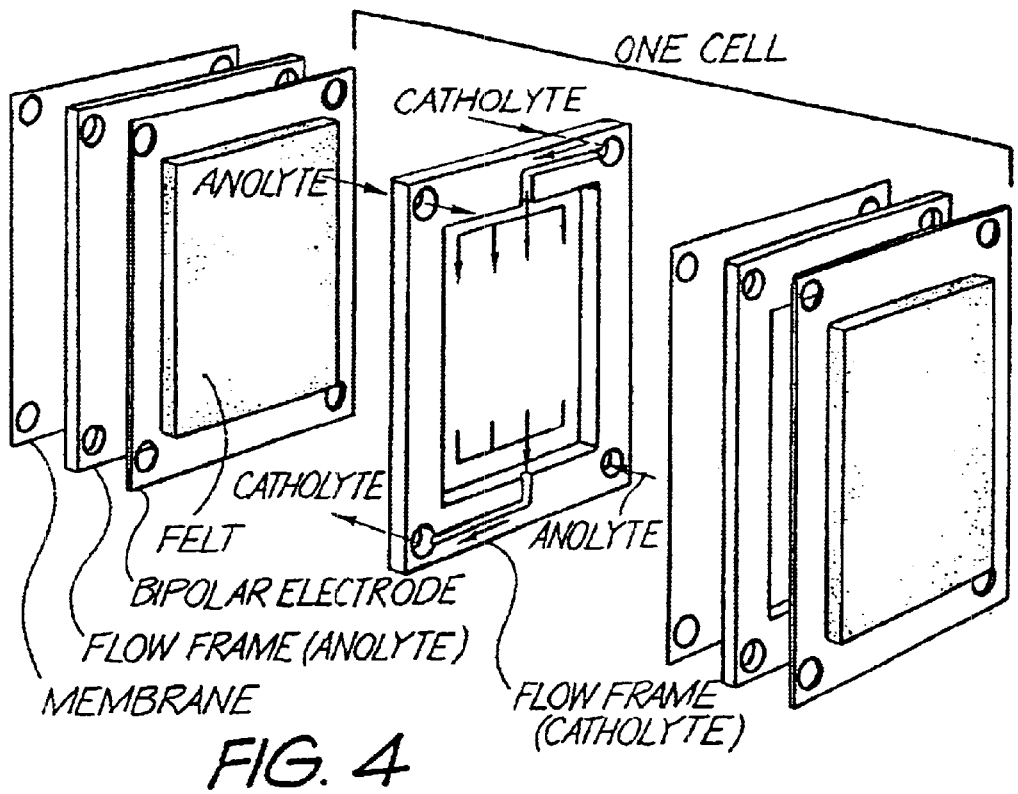
FIG. 4 illustrates the assembly of stack components in a vanadium redox cell.

General cell assembly for Tests IV and V is illustrated in the scheme in FIG. 4. The cell stack consists of two end-electrodes (glassy carbon sheets on copper current collectors), the bipolar test electrode on the positive half cell, a graphite felt in the negative half cell, a Nafion 112 membrane between the test electrode and the negative graphite felt, two flow-frames and rubber gaskets.

Microscopic Characterization

To illustrate the penetration of the graphite fibre material into the polymer substrate cross sections of bipolar electrodes were investigated with a Hitachi S4550 field emission electron microscope (FESEM). See micrographs FIGS. 7a and 7b.

Examples 1a and 1b

Figure 3:
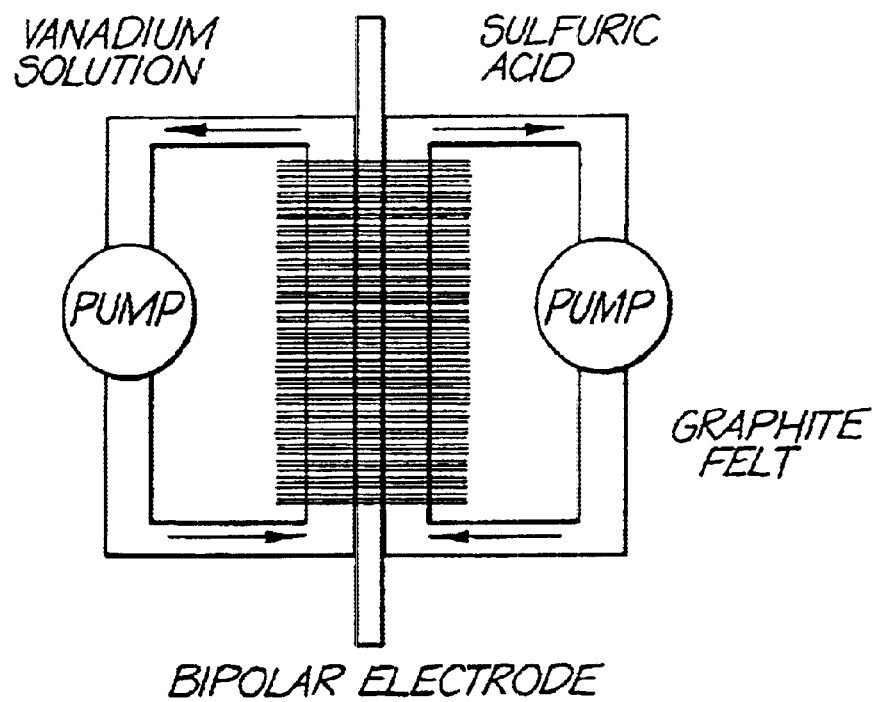
FIG. 3 illustrates the setup of a flow cell for the permeability testing of a bipolar electrode of this invention.
Figure 7A:
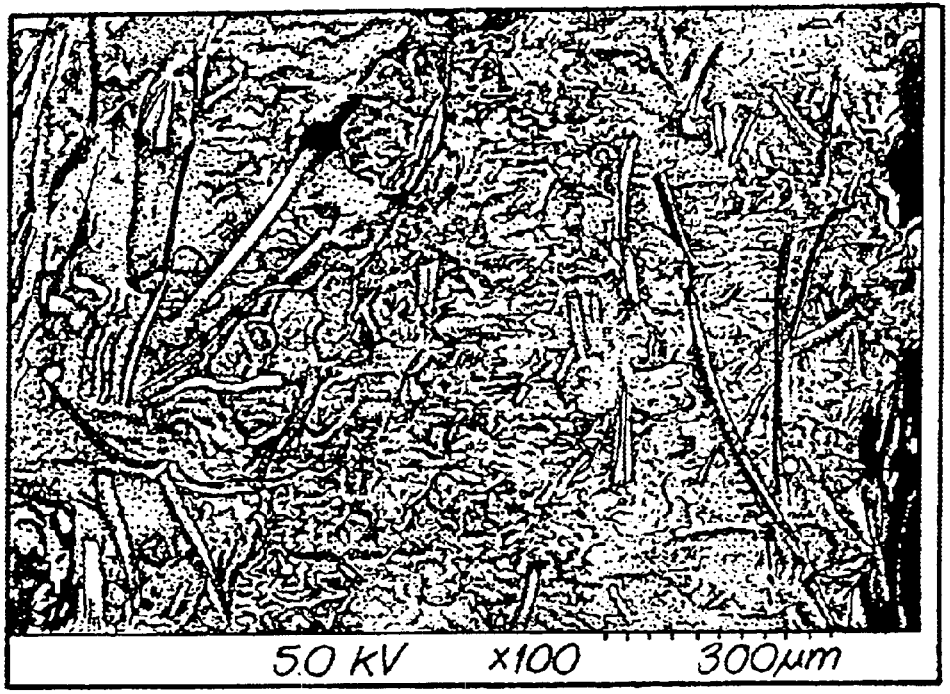
FIGS. 7a) and 7b) are FESEM micrographs of cross section of bipolar electrodes of the present invention.
Figure 7B:
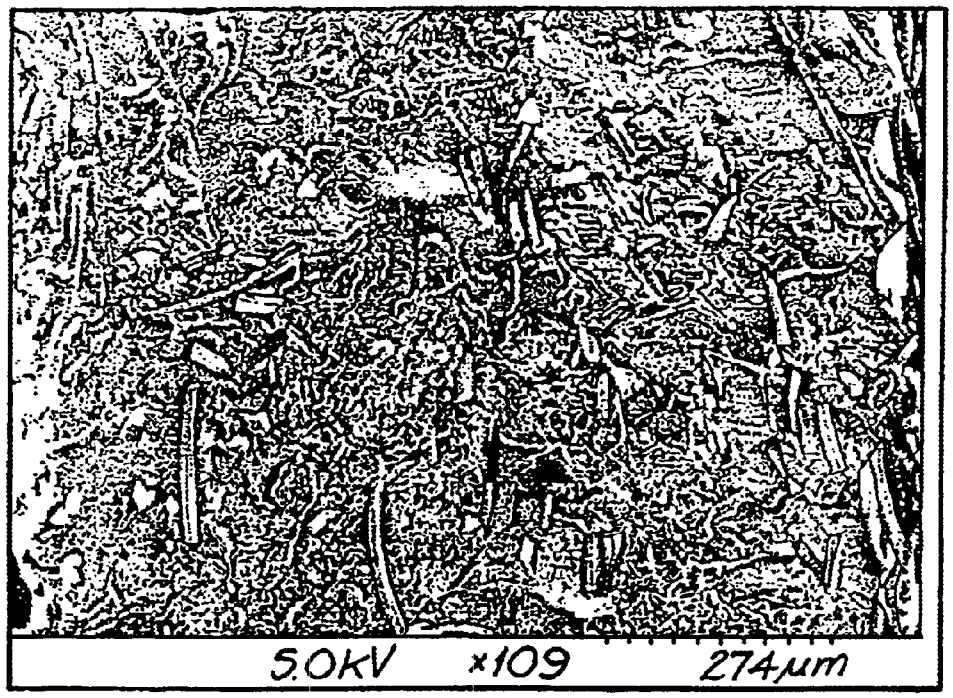

Material A was used as a substrate in the above described felt bonding process I. Felt bonding times were 10 minutes (sample 1a) and 20 minutes (sample 1b). The results of the area resistivity measurements (Test I) are shown in FIG. 6. Electrodes of type 1a were used for permeability tests (Test II and III) which showed no permeability of Vanadium electrolyte during 3 months for Test II and 3 weeks for Test III (Experiment was stopped after this period). The set up for permeability Test III is illustrated in FIG. 3. Electrodes of type 1a were also used for overcharging experiments according to Test IV. The carbon black free bipolar electrodes of the invention showed only a small increase of resistance after overcharging ($R_{OC}$) and reversibility of the overcharging products after reverse set up ($R_{rev}$). Results are shown in Table III. Furthermore, the 1a electrodes were used for evaluation of cell performance described under Test V. These results are illustrated in Table IV. Cross sections of electrodes of type 1a were investigated by field emission electron microscopy (FESEM). The scheme of the overlapping graphite fibres is illustrated in FIG. 5. Typical micrographs are illustrated in FIGS. 7a and b.

Examples 2a–2d

Material C was used as a substrate in the above prescribed felt bonding process I. Felt bonding times were 10 (samples 2a), 20 (sample 2b), 30 (sample 2c) and 40 minutes (sample 2d). Area resistivity measurements (Test I) of the produced electrodes are illustrated in FIG. 6 and show constantly and reasonable low conductivities just for electrodes of type 2d. Due to the required long process times comparable to electrodes of type 1a no further testing (Tests II–V) was performed.

Example 3

Material D was used as a substrate in the above described felt bonding process I. Felt bonding time was 10 minutes. Temperature at felt-binding was 135° C. The results of the area resistivity measurements (Test I) are shown in Table II. Electrodes of this Example were used for evaluation of cell performance described under Test V. These results are illustrated in FIG. 10 (Table IV).

Example 4

Material E was used as a substrate in the above described felt bonding process I. Felt bonding time was 10 minutes. Temperature at felt-bonding was 135° C. The results of the area resistivity measurements (Test I) are shown in FIG. 8 (Table II).

Example 5

Material A was used as a substrate in the above described felt bonding process I. Felt bonding time was 10 minutes. Additionally, two copper plates (L×W×H: 50×50×1 mm) were inserted on each side of the graphite felt/substrate assembly during the felt bonding process to increase the pressure on the felt for enhanced penetration of the graphite fibres into the polymer sheet substrate (see Scheme in FIG. 2b). The results of the area resistivity measurements (Test I) are shown in FIG. 8 (Table II).

Examples 6a–6b

Material C was used as a substrate in the above-described felt bonding process I. Felt bonding time was 10 minutes. Temperature at felt-bonding was 145° C. for sample 6a and 180° C. for sample 6b, respectively. Additionally, two copper plates (L×W×H: 50×50×1 mm) were inserted on each side of the graphite felt/substrate assembly during the felt bonding process to increase the pressure on the felt for enhanced penetration of the graphite fibres into the polymer sheet substrate (see FIG. 2b). The results of the area resistivity measurements (Test I) are shown in Table II.

Examples 7a–b

Material C in the dimension of a full sized electrode (700×450×1 mm) was used as a substrate in the above described felt bonding process I. Felt size was 500×320×5 mm of Sigri graphite felt. Felt bonding time was 15 minutes for electrode 7a and 30 minutes for electrode 7b. Temperature at felt-bonding was 180° C. Additionally, two copper plates (L×W×H: 500×300×1 mm) were inserted on each side of the graphite felt/substrate assembly during the felt bonding process to increase the pressure on the felt for enhanced penetration of the graphite fibres into the polymer sheet substrate (see FIG. 2b). The results of the area resistivity measurements (Test I) are shown in FIG. 8 (Table II).

To provide electrical contact to each bipolar electrode, a short length (approximately 10 cm) of graphite fibre bundles, in incorporated into one side of the bipolar electrode by inserting one end between the plastic sheet and graphite felt sheet, with the other end extending out past the plastic frame. During the felt bonding process, the fibre bundle becomes embedded in the plastic sheet, but makes electrical contact with the graphite felt layer at one end, the other end remaining exposed for electrical contact outside the final stack assembly.

Conclusion

Results from the above tests show that bipolar electrodes produced using material A (samples 1a and b and 6) as substrate material possess the lowest electrical resistivities and require a relatively low bonding temperature and short processing time. Furthermore such electrodes show preferable behaviour during overcharge conditions compared to standard bipolar electrodes with high carbon black fill grades of conducting plastic composite substrate. Also the efficiency of such electrodes is comparable to standard electrodes and suitable for applications in Vanadium Redox Batteries.

What is claimed is:

1. An electrode including a layer of non-conductive electrode substrate material having a first surface and an opposing second surface, one of said first and second surfaces carrying a first layer of electrochemically active material, the other of said surfaces carrying a second layer of either electrochemically active material or electrically conductive material and wherein said first and second layers contact so as to provide a current transfer pathway through said substrate material.

2. An electrode according to claim 1 wherein said electrode is a bipolar electrode having each of said first and second surfaces of said non-conductive electrode substrate material carrying a layer of electrochemically active material.

3. An electrode according to claim 1 wherein said electrochemically active material is fibrous and wherein at least some fibres of at least one of said layers of electrochemically active material penetrate said electrode substrate material and contact said second layer to provide a current transfer pathway between said layers thorough the substrate material.

4. An electrode according to claim 2 wherein said electrochemically active material is fibrous and wherein at least some fibres of both of said opposing layers of electrochemically active material penetrate said electrode substrate material and contact to provide a current transfer pathway between said layers through the substrate material.

5. An electrode according to claim 3 wherein said non-conductive electrode substrate material is a polymeric electrode substrate material which is characterised by a melt flow index (MFI) of greater than 5 (190° C./2.16 kg) [g/10 min].

6. An electrode according to claim 1 wherein said electrode is an end electrode with one of said first and second surfaces of said non-conductive electrode substrate material carrying a first layer of electrochemically active material, the other of said surfaces carrying a second layer of electrically conductive material and wherein said first and second layers contact so as to provide a current transfer pathway through said substrate material.

7. An end electrode according to claim 6 wherein said electrochemically active material is fibrous and wherein fibres of the first layer of electrochemically active material penetrate the electrode substrate material and contact the layer of electrically conductive material to provide a current transfer pathway through the substrate material.

8. An end electrode according to claim 7 wherein the non-conductive electrode substrate material is a non-conductive polymeric material characterised by a melt flow index (MFI) of greater than 5 (190° C./2.16 kg) [g/10 min].

9. A process for manufacturing an electrode, said process including forming an assembly comprising a layer of non-conductive plastic electrode substrate material between either a first and opposing second layer of electrochemically active material, or a first layer of electrochemically active material and an opposing second layer of electrically conductive material and applying heat and pressure to said assembly such that the first and second layers are caused to contact so as to provide a current transfer pathway through said polymeric substrate material.

10. A process for manufacturing a bipolar electrode, said process including forming an assembly comprising a layer of non-conductive plastic electrode substrate material between two opposing layers of electrochemically active material, and applying heat and pressure to said assembly such that the opposing layers of electrochemically active material are caused to penetrate through said substrate material such that they contact to provide a current transfer pathway.

11. The process as claimed in claim 9 wherein said electrochemically active material is fibrous and wherein said non-conductive plastic electrode substrate material is a non conductive polymeric electrode substrate material characterised by a melt flow index (MFI) such that said application of pressure causes at least some fibres of at least one of said layers of electrochemically active material to penetrate said electrode substrate material and contact said second layer to provide a current transfer pathway between said layers through the substrate material.

12. A process for manufacturing an end electrode, said process including forming an assembly comprising a layer of non-conductive plastic electrode substrate material between a first layer of electrochemically active material and an opposing second layer of electrically conductive material, and applying heat and pressure to said assembly, such that the layer of electrochemically active material is caused to penetrate through said polymeric substrate material and contact said layer of electrically conductive material to provide a current transfer pathway through said plastic substrate material.

13. The process as claimed in claim 12 wherein said electrochemically active material is fibrous and wherein said non-conductive plastic electrode substrate material is a non-conductive polymeric electrode substrate material characterised by a melt flow index (MFI) such that said application of pressure causes fibres of the layer of electrochemically active material to penetrate through said polymeric substrate material and contact said layer of electrically conductive material to provide a current transfer pathway through the substrate material.

14. A battery including a catholyte in electrical contact with a positive electrode and an anolyte in electrical contact with a negative electrode, wherein at least one of the positive and negative electrodes is an electrode of any one of claims 1–8, or an electrode when prepared according to the process of any one of claims 9–13.

15. The battery as claimed in claim 14, wherein said battery is a redox battery.

16. An all-vanadium redox battery having a positive compartment containing a catholyte in electrical contact with a positive electrode, the catholyte comprising an electrolyte containing tetravalent or pentavalent vanadium ions, a negative compartment containing an anolyte in electrical contact with a negative electrode, the anolyte comprising an electrolyte containing tetravalent, trivalent or divalent vanadium ions, and an ionic conducting separator disposed between the positive and negative compartments and in contact with the catholyte and anolyte to provide ionic communication there between and wherein the catholyte includes a salt selected from $V_2O_5$, $V_2O_3$, $V_2O_4$, VO, $VSO_4$, $VOSO_4$, $V_2(SO_4)_3$, $(VO_2)SO_4$ and $NH_4VO_3$, and the concentration of the salt is 0.1M to 8.0M, more particularly 0.1M to 5.0M and wherein at least one of the positive and negative electrodes is an electrode of any one of claims 1–8, or an electrode when prepared according to the process of any one of claims 9–13.

\* \* \* \* \*